United States Patent [19]
Griffin

[11] Patent Number: 5,002,324
[45] Date of Patent: Mar. 26, 1991

[54] COMPACTABLE UTILITY RACK FOR PICKUP TRUCK

[76] Inventor: Frank A. Griffin, 4210 Coronado Ave., Ste. 6, Stockton, Calif. 95208

[21] Appl. No.: 561,016

[22] Filed: Jul. 31, 1990

[51] Int. Cl.⁵ .............................................. B60P 3/00
[52] U.S. Cl. .................................. 296/3; 224/42.45 R
[58] Field of Search ...................... 296/3, 27, 26, 102; 224/42.45 R

[56] References Cited
U.S. PATENT DOCUMENTS

| | | | |
|---|---|---|---|
| 4,152,020 | 5/1979 | Brown et al. | 296/3 |
| 4,405,170 | 9/1983 | Raya | 296/3 |
| 4,423,899 | 1/1984 | Langmead | 296/3 |
| 4,779,916 | 10/1988 | Christie | 296/3 |
| 4,864,628 | 8/1989 | Holberg | 296/3 |

*Primary Examiner*—Robert R. Song
*Attorney, Agent, or Firm*—Basil Travis

[57] ABSTRACT

A compactable or expandable elevated utility rack for pickup trucks has been invented wherein a moveable vertical stanchion unit may be positioned along a permanently mounted horizontal rail atop the lateral walls of the cargo bed of a pickup truck by pairs of metal brackets located thereon.

3 Claims, 4 Drawing Sheets

COMPACTABLE UTILITY RACK FOR PICKUP TRUCK

BACKGROUND OF THE INVENTION

This invention relates to compactable truck racks as distnguished from collapsible, adjustable or stationary truck racks. More specifically, the present invention pertains to an elevated framework mounted above the cargo bed of a pickup truck where the position of at least one vertical stanchion unit may be manually disconnected and reversibly and alternately moved between an expanded position for carrying materials and a compacted position position when not in use. The expandable and compactable features of the vertical stanchion unit are made possible by pairs of metal brackets located at desired positions along a permanently mounted horizontal rail by which each bracket may slidingly receive the base of the moveable stanchion unit for vertical positioning above the walls over the bed of a pickup truck.

As it is perhaps well known, pickup trucks are very popular not only for work but for play. A pickup truck typically has a cab, a cargo bed surrounded by three lateral walls, and a tailgate at the rear. Several types of framework for carrying material, also called utility racks, are presently in use with pickup trucks. Some of these racks are adjustable for carrying various lengths of items such as ladders, pipes, lumber and so forth. Other racks are stationarily and permanently attached to the bed of a pickup truck which might be suitable for a particular kind of work but often restricts use of the truck for recreation or carrying large cargo in the bed. In order to remedy this situation, collaspible racks have been invented and are known in the prior art, but because collapsible racks often times are constructed with hinges and moveable joints they generally detract from the truck's overall appearance and are not as sturdy as a stationary rack. Then too, they are usually difficult to install, operate, and their moveable joints often tend to rattle as the truck is driven causing an annoying sound.

Accordingly, it is an object of the present invention to provide a compactable utility rack which may be closed into a small unit rearward of the cab of a pickup truck when said rack is not in use in order to free the bed from obstruction.

It is another object of the present invention to provide a utility rack pleasing in appearance for a pickup truck when the rack is in either expanded or compacted position.

It is yet another object of the present invention to provide a sturdy utility rack in its expanded position that does not rattle as the pickup truck is driven.

These objects and other objects and advantages of the present invention will be apparent from the following description.

SUMMARY OF THE INVENTION

In accordance with the present invention, the utility rack consists of a horizontal rail and two vertical stanchion units, one fixed and the other moveable along the horizontal rail. The horizontal rail is preferably made from angle iron which can be bent to accomodate a variety of pickup truck beds so that a cross-sectional view of the 90° angle iron rail will resemble an inverted "L" forming a continuous horizontal platform with an internal vertical skirt set atop of and covering the top of the three lateral walls of a pickup truck bed. The horizontal platform of said rail provides a foundation for the vertical stanchion units while the vertical internal skirt of said rail provides the lateral support therefore.

The two vertical stanchion units generally resemble an inverted "U" but of ornate design to compliment the truck's overall appearance. The forward stanchion unit is permanently mounted to the platform of the horizontal rail by welding the base of each vertical leg to the platform of said rail just behind the cab of the pickup truck. The moveable rear stanchion unit is held in place by a pair of brackets mounted on the platform of said horizontal rail just rearward of the permanent stanchion where said brackets may slidingly receive the legs of the moveable rear stanchion unit when it is not in use and in the compacted position.

A pair of identical brackets, but in a reversed position, are mounted at the end of the platform of the horizontal rail near the tailgate of the pickup truck to slidingly and reversably receive the legs of the moveable rear stanchion unit and thereby expanding the utility rack for carrying various items.

DESCRIPTION OF THE PREFERRED EMBODIMENT

Figure 1:
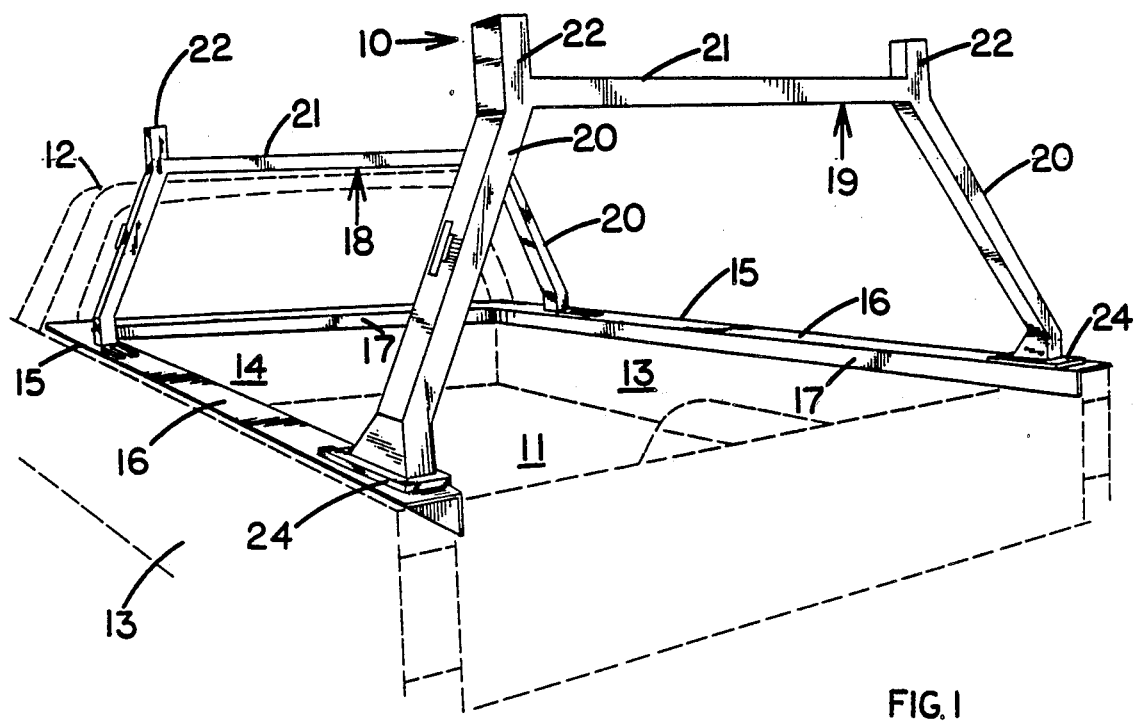
FIG. 1 is a perspective view showing the utility rack of the present invention in its open or expanded position and installed on the bed of a pickup truck.
Figure 2:
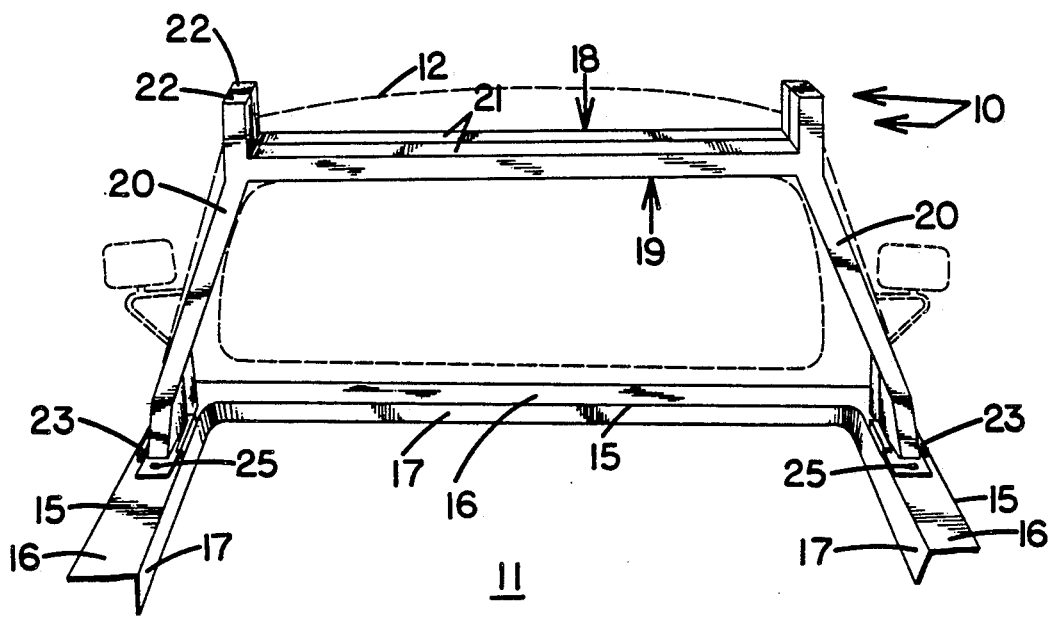
FIG. 2 is a perspective view showing the rack in its closed or compacted position.

Referring now to FIGS. 1-2 of the drawings, the utility rack 10 is illustrated in both its open-expanded position and its closed-compacted position while installed above the cargo bed 11 of a pickup truck having a cab 12 forward of said cargo bed 11. The cargo bed 11 is bounded by three raised lateral walls. These walls consist of paired sidewalls 13 and a forward wall 14. There is usually a tailgate at the rear of the cargo bed 11 also.

In the preferred embodiment of this invention, and what is believed to be the first unique, novel and nonobvious feature thereof, a horizontal rail 15 is placed atop of an continuously around the top of the three raised lateral walls 13 and 14 of the cargo bed 11. Since the rail is preferably made of 90° angle iron, the rail 15 can be bent by several known technologies to conform to the size and shape of a variety of pickup truck beds, and it can be attached to said walls of the bed by bolts. The two planar surfaces of the angle iron, opposed at a 90° angle, provide both a horizontal platform 16 atop said walls 13 and 14, and in addition also provide a perpendicular inner skirt 17 around the top of said walls to give lateral support to said platform 16. In other words, a cross-sectional view of said horizontal rail 15 as viewed from the tailgate resembles in inverted "L" which provides a very sturdy foundation for the utility rack 10. This feature is believed to be a significant improvement over the prior art because virtually all known utility racks are attached to the beds of pickup trucks by vertical posts rather than by horizontal rails with an inner skirt, and the advantageous of the rail over posts are several.

First of all, present utility racks with attaching vertical posts must necessarily be custom made for a particular style of a pickup truck bed because not all beds are exactly the same size. For example, some pickup trucks provide slots or holes in the top of their lateral walls to receive posts but the location of said holes vary from model to model. Then too, some vertical posts of utility racks are designed to be fastened directly to the cargo bed but because cargo beds often vary in shape and size the vertical posts almost always need to be designed for a particular truck. The present invention elliminates these problems in that the horizontal rail 15 can be bent by a variety of techniques to fit atop virtually all lateral walls of any known pickup turck bed and this universal application is believed to be the first patentable feature of the present invention.

Secondly, there is also the question of strength. It is an old axiom which says that a house built upon stilts will not stand, and that is particularly true of utility racks built upon poles which are designed to carry heavy loads above the body of a moving vehicle. Some utility racks presently in use are supported by vertical posts as little as 1" wide, which may be alright for carrying a ladder, but could result in serious problems with heavy loads such as lumber, especially under centrifugal force as the vehicle is driven around corners. Obviously, a horizontal platform with an internal skirt for lateral support by the bed itself provides greater support for the load and this feature is believed to be another patentable feature of the present invention.

Figure 3:
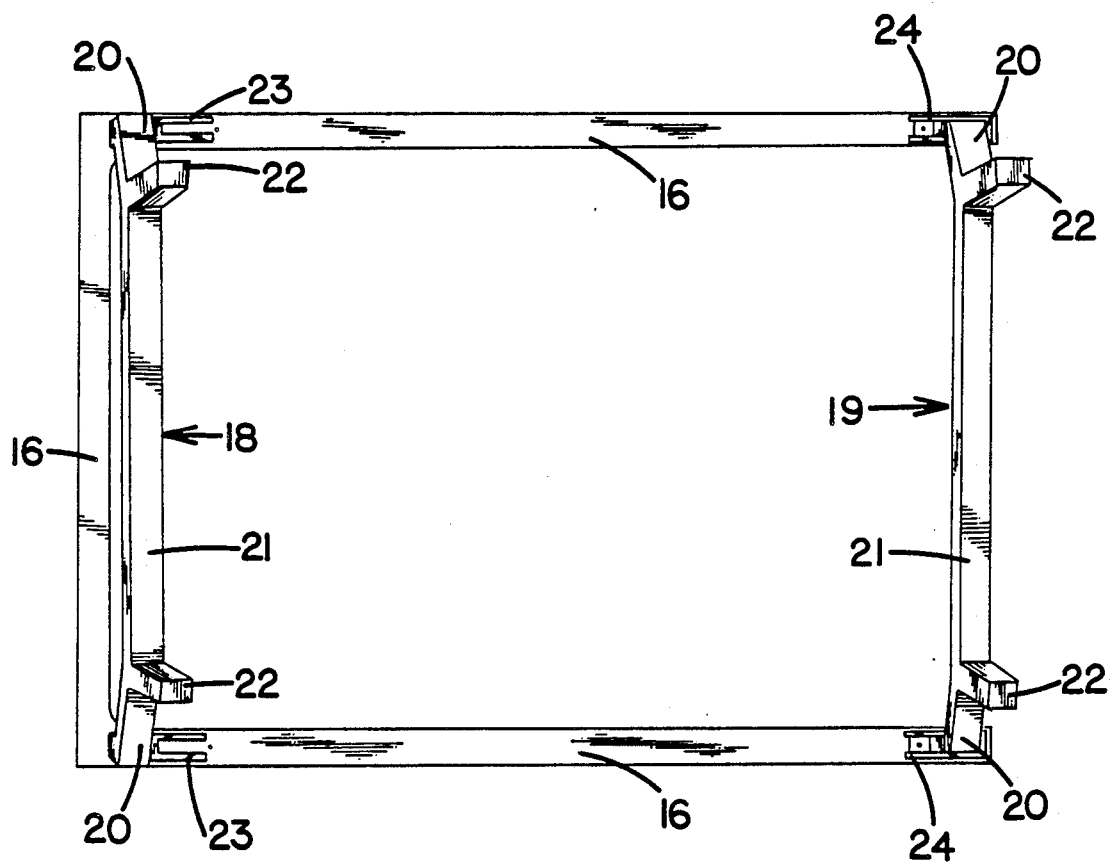
FIG. 3 is a top plan view of the rack in its expanded position
Figure 4:
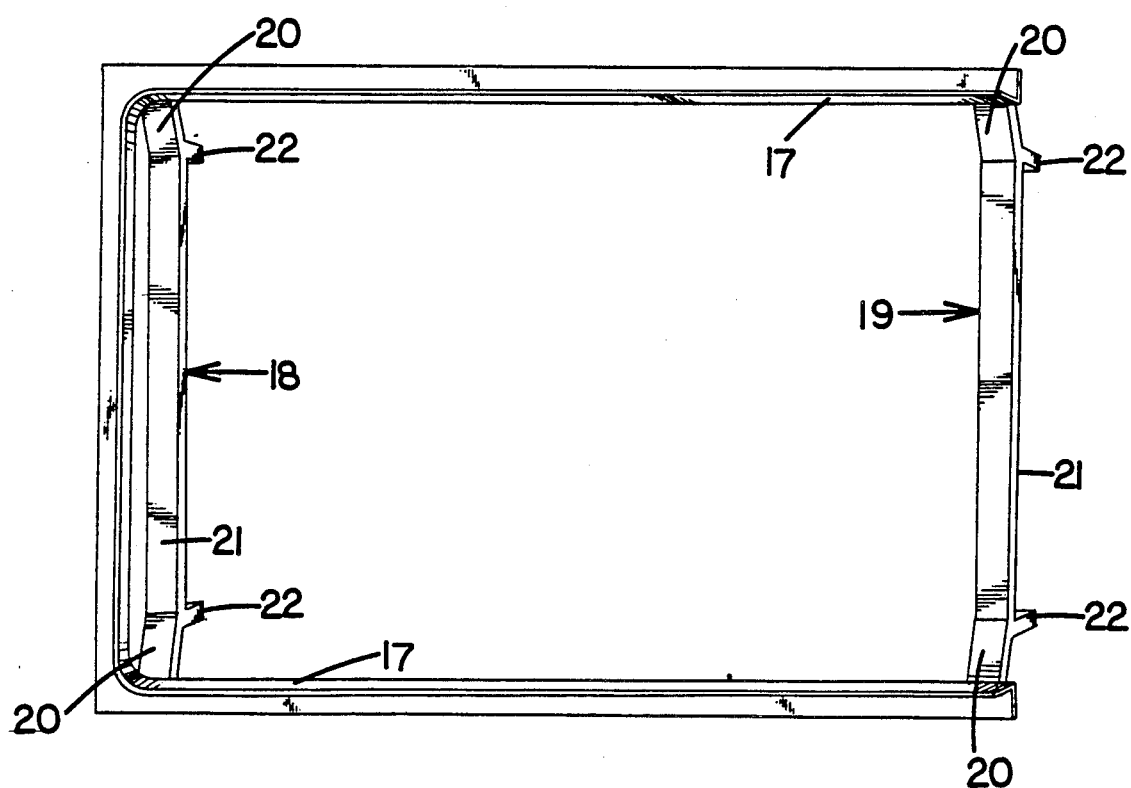
FIG. 4 is a bottom plan view of the rack in its expanded position.

FIGS. 1-3 also illustrate the preferred configuration of the vertical stanchion units. The forward stanchion unit is generally designated by the reference numeral 18. The rearward stanchion unit is generally designated by the reference numeral 19. It is seen tha the pairs of vertical legs 20 of the stanchion units are bent inwardly toward the center of gravity of the pickup truck bed and are connected by a horizontal member generally designated as 21. A pair of vertical projections, generally designated as 22 extend above said horizontal member 21 to provide lateral support for th load. The inverted "U" ornate shape of the stanchion units not only compliments the truck's overall appearance but because the legs 20 are bent inwardly toward the center of gravity, this feature is believed to provide additional strength to carry heavy loads especially against centrifugal forces as the the vehicle is driven around corners and this feature is believed to be another improvement over the prior art utility racks.

Figure 5:
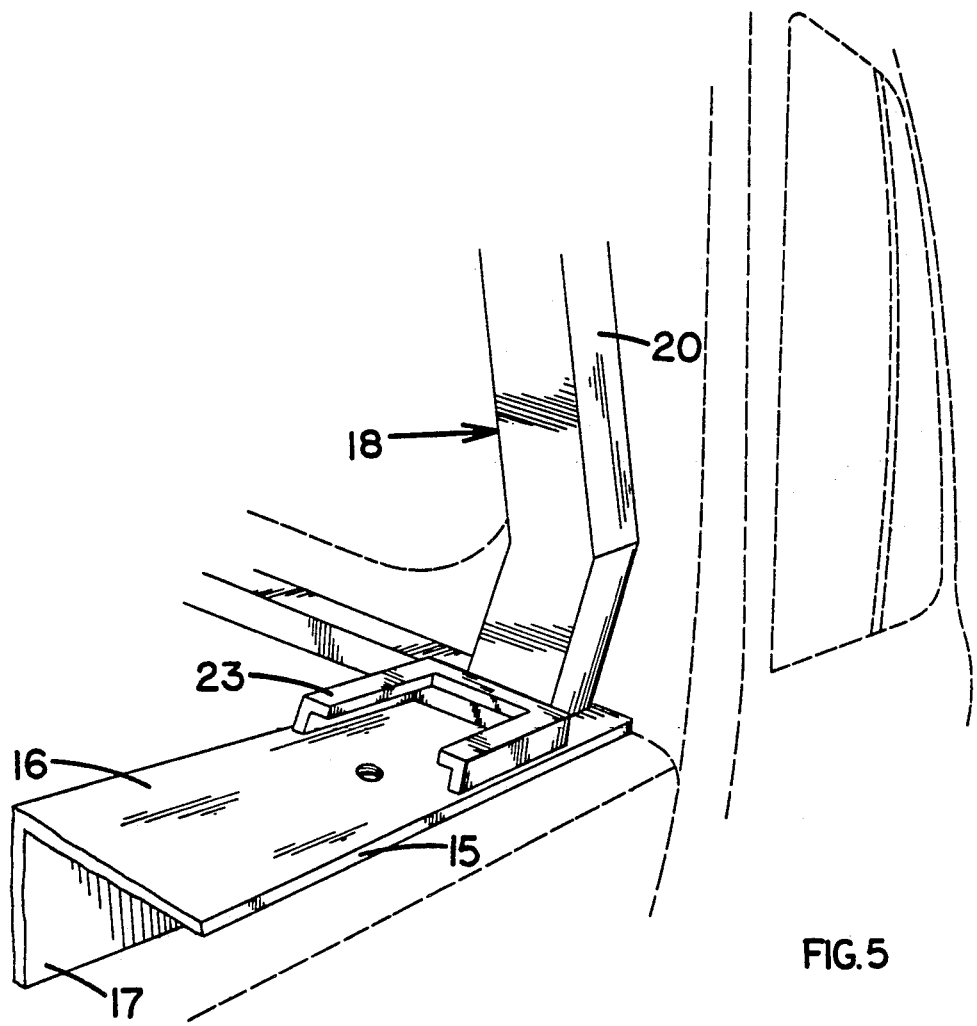
FIG. 5 is an enlarged detailed perspective view of one of the forward brackets pairs.

FIG. 2 illustrates the utility rack 10 of the present invention in its closed or compacted position, and thereby allowing unrestricted access to the cargo bed 11. It can be seen that the rearward stanchion unit 19 is compacted for storage against the forward stanchion unit 18, which is permanently mounted to the horizontal platform 16 of rail 15 just behind the cab 12. A storage bracket 23 is also permanently mounted to the rear of each forward stanchion 18 leg 20 to slidingly receive and hold the corresponding leg 20 of the rearward stanchion unit 19, as illustrated in FIG. 5. A bolt may be used to lock each leg of the rearward stanchion unit 19 into its corresponding bracket 23 when the utility rack 10 is not in use and in its closed or compacted position as illustrated in FIG. 2.

Figure 6:
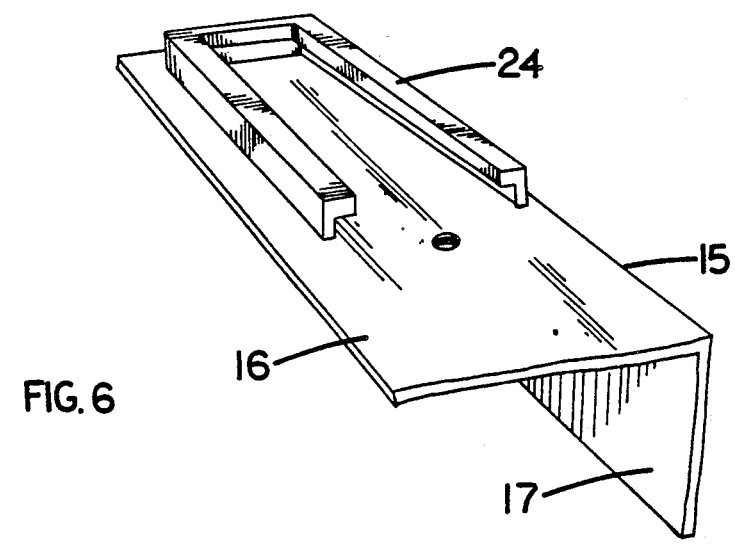
FIG. 6 is an enlarged detailed perspective view of one of the rear bracket pairs.
Figure 7:
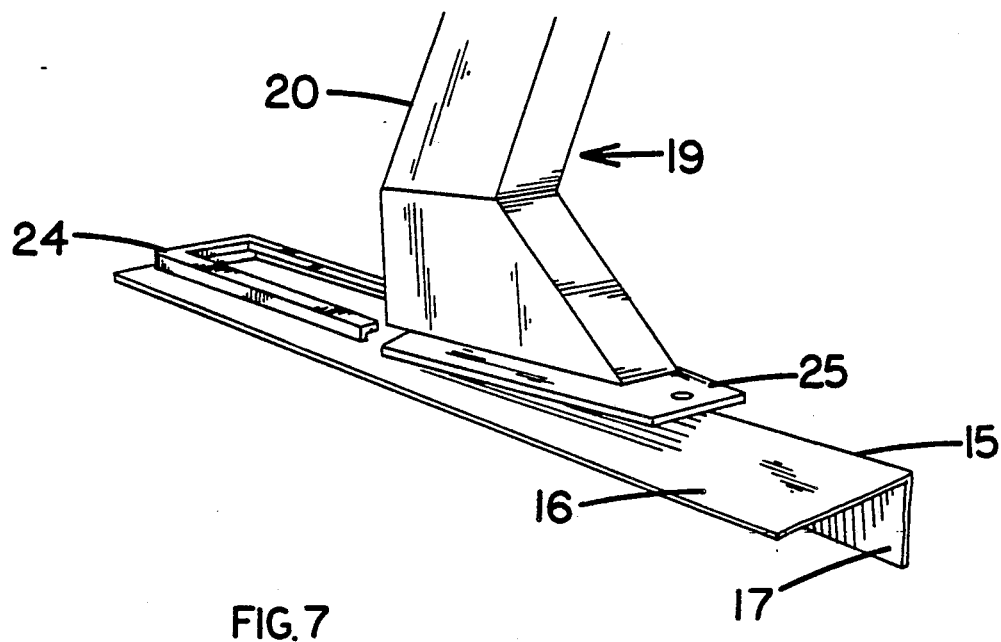
FIG. 7 is an enlarged fragmetary perspective view showing the flange on one leg of the rearward stanchion unit positioned for sliding into the rear bracket.
Figure 8:
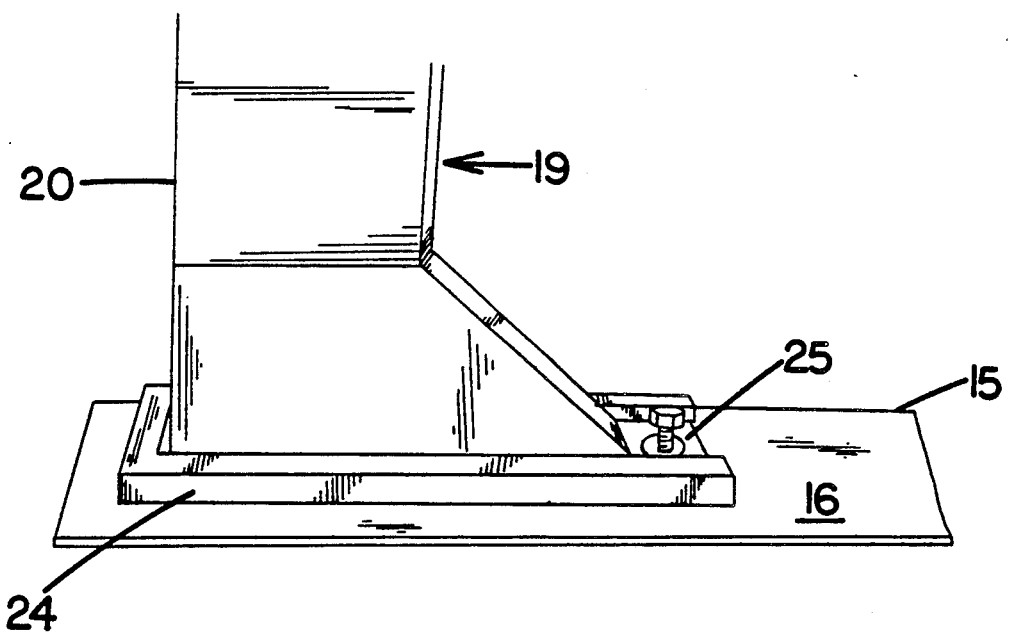
FIG. 8 is an enlarged fragmentary perspective view of one leg of the rearward stanchion unit being bolted into the rear bracket to lock the rack into its expanded position.

FIGS. 6-8 illustrate the way to open or expand the utility rack 10 for use. A pair of brackets 24 are located at the rear of the plateform 16 of the rail 15 to slidingly receive a projecting edge or flange 25 located around the base of each leg 20 of the rearward stanchion unit 19 as shown in FIG. 7. The design of the flange 25 at the base of the rearward stanchion 19 legs 20 is believed to be yet another patentable feature of the present invention because in the compacted postion (FIG. 2) the flange 25 is projecting rearwardly from the storage bracket 23, and in the expanded position (FIG. 8) the flange 25 is projecting frontwardly from the rear brackets 24. This means, of course, that the rearward stanchion unit 19 need be manually reversed or turned in a complete 360° circle between the compacted position (FIG. 2) and the expanded position (FIG. 1). The turning around manually of the rearward stanchion unit 19 to fully expand or compact the rack 10 is believed to be still yet another new and novel feature not found in utility racks in the prior art. FIG. 8 also illustrates how the base of the rearward stanchion 19 legs 20 may be bolted into the bracket 24, resulting n the utility rack 10 being ready for use.

While my invention has been particularly described in a preferred embodiment and by way of specific illustrations, I do not wish to be limited thereto because obvious modifications may be obvious to one skilled in the art. For example, additional brackets may easily be located along the rail 15 for positioning stanchion units at various locations over the cargo bed 11. Then too, the stanchion units of the present invention are illustrated by rectangular bars of particular dimensions and of particular ornate design but it should also be recognized that said rack could as well have been constructed from tubular or cylindrical material of varying composition or dimensions. Therefore, the goal of the appended claims is to cover all such changes and modifications as fall within the true spirit and scope of the invention.

I claim:

1. A utility rack for a pickup truck, the truck having a cab and a cargo bed disposed rearward of the cab, the cargo bed surrounded by three lateral walls, said rack comprising:

A. a horizontal rail of angle iron placed atop and continuously around said three lateral walls, said rail cross-sectionally resembling an inverted "L" and resulting in a horizontal platform with a perpendicular inner skirt around said walls for lateral support of said platform;

B. two vertical stanchion units generally resembling an inverted "U" but of ornate design to compliment said truck's overall appearance, each said stanchion units having pairs of vertical legs extending upwardly but inwardly to a common cross member, the said legs of said forward stanchion unit being permanently attached to said platform of said horizontal rail just behind said cab, but the second rearward stanchion unit being manually moveable between a closed-compacted position and an open-expanded position;

1. a pair of forward storage brackets mounted on said platform of said horizontal rail to the rear of said forward stanchion unit to slidingly receive a flange at the base of each vertical leg of the moveable rearward stanchion unit to close or compact said stanchions together when said utility rack is not in use and thereby allowing unrestricted access to said cargo bed of said pickup truck;
2. a second pair of brackets mounted on said platform, but facing in an opposite direction at the rear of said platform, to slidingly receive said flange at the base of each vertical leg of the moveable rearward stanchion unit as it is manually turned in a complete 360° circle and moved rearwardly to its expanded position and support by the said rear brackets.

2. The utility rack of claim 1 wherein the platform of the horizontal rails above the lateral walls of the pickup truck bed contain a plurality of brackets for positioning the rearward stanchion unit in more than one open-expanded position.

3. The utility rack of claim 1 wherein the vertical stanchion units are of tubular construction.

* * * * *